United States Patent
Namiki

(10) Patent No.: US 11,625,842 B2
(45) Date of Patent: Apr. 11, 2023

(54) IMAGE PROCESSING APPARATUS AND IMAGE PROCESSING METHOD

(71) Applicant: FANUC Corporation, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 324 days.

(21) Appl. No.: 16/575,388

(22) Filed: Sep. 19, 2019

(65) Prior Publication Data

US 2020/0098118 A1    Mar. 26, 2020

(30) Foreign Application Priority Data

Sep. 20, 2018    (JP) .............................. JP2018-176026

(51) Int. Cl.
| | |
|---|---|
| *G06T 7/33* | (2017.01) |
| *G06T 7/73* | (2017.01) |
| *G06T 3/20* | (2006.01) |
| *G06T 7/00* | (2017.01) |

(52) U.S. Cl.
CPC .................. *G06T 7/33* (2017.01); *G06T 3/20* (2013.01); *G06T 7/73* (2017.01); *G06T 7/97* (2017.01); *G06T 2200/04* (2013.01)

(58) Field of Classification Search
CPC .... G06T 7/33; G06T 7/73; G06T 3/20; G06T 7/97; G06T 2200/04; G06T 2207/10012; G06T 2207/30164; G06T 7/593; G06T 7/75; G06T 7/13; G06T 7/285; G06T 3/403; G06T 7/251; G01B 11/00
See application file for complete search history.

(56) References Cited

U.S. PATENT DOCUMENTS

| | | | |
|---|---|---|---|
| 2005/0002555 A1 | 1/2005 | Kumiya et al. | |
| 2012/0274739 A1 | 11/2012 | Li | |
| 2014/0118500 A1* | 5/2014 | Liu | H04N 13/204 |
| | | | 348/46 |

(Continued)

FOREIGN PATENT DOCUMENTS

| | | |
|---|---|---|
| CN | 1550297 A | 12/2004 |
| CN | 101082988 A | 12/2007 |

(Continued)

*Primary Examiner* — Claire X Wang
*Assistant Examiner* — Han Hoang
(74) *Attorney, Agent, or Firm* — Hauptman Ham, LLP

(57) ABSTRACT

An image processing apparatus includes: a model pattern storage unit that stores a model pattern composed of a plurality of model feature points; an image data acquisition unit that acquires a plurality of images obtained through capturing an object to be detected; an object detection unit that detects the object to be detected from the images using the model pattern; a model pattern transformation unit that transforms a position and posture such that the model pattern is superimposed on an image of the object to be detected; a corresponding point acquisition unit that acquires a corresponding point on image data corresponding to each of the model feature points; a corresponding point set selection unit that selects a set of corresponding points on the plurality of images; and a three-dimensional position calculation unit that calculates a three-dimensional position of the image of the object to be detected.

10 Claims, 10 Drawing Sheets

(56) References Cited

U.S. PATENT DOCUMENTS

| | | | |
|---|---|---|---|
| 2014/0294286 A1* | 10/2014 | Kitajima | G06T 7/74 382/153 |
| 2016/0086343 A1 | 3/2016 | Namiki et al. | |
| 2017/0132451 A1 | 5/2017 | Namiki et al. | |
| 2020/0081249 A1* | 3/2020 | Brusnitsyn | G06T 7/13 |

FOREIGN PATENT DOCUMENTS

| CN | 101089551 A | 12/2007 |
|---|---|---|
| CN | 101231750 A | 7/2008 |
| CN | 101251373 A | 8/2008 |
| JP | 2016-61687 A | 4/2016 |
| JP | 2017-91079 A | 5/2017 |
| WO | 2011076104 A1 | 6/2011 |

\* cited by examiner

IMAGE WHICH IS
CAPTURED BY FIRST
CAMERA 4A

IMAGE WHICH IS
CAPTURED BY SECOND
CAMERA 4B

FIG. 6
IMAGE WHICH IS CAPTURED BY FIRST CAMERA 4A AND FROM WHICH EDGE LINE IS EXTRACTED
IMAGE WHICH IS CAPTURED BY SECOND CAMERA 4B AND FROM WHICH EDGE LINE IS EXTRACTED
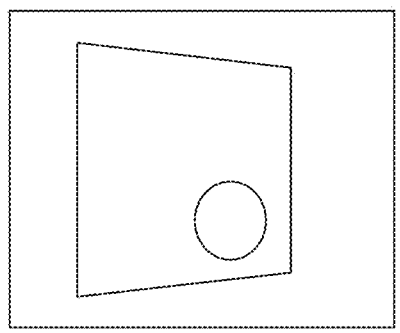
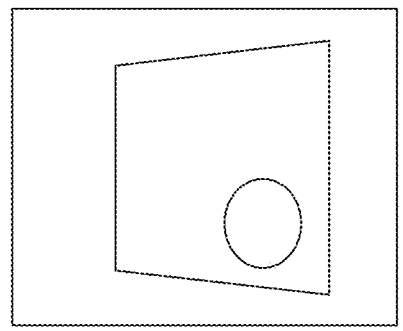
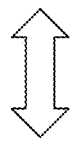
IMAGE MATCHING
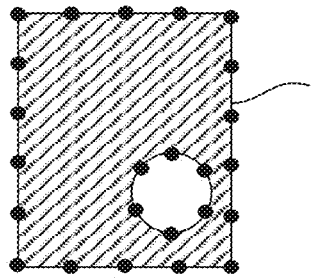
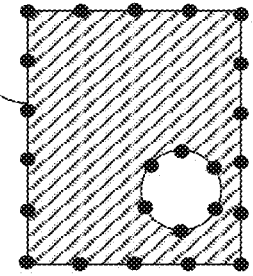
IDENTICAL MODEL PATTERN FIG. 7
IMAGE WHICH IS CAPTURED BY
FIRST CAMERA 4A AND FROM
WHICH EDGE LINE IS EXTRACTED
IMAGE WHICH IS CAPTURED BY
SECOND CAMERA 4B AND FROM
WHICH EDGE LINE IS EXTRACTED
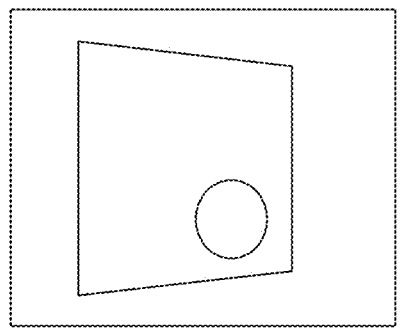
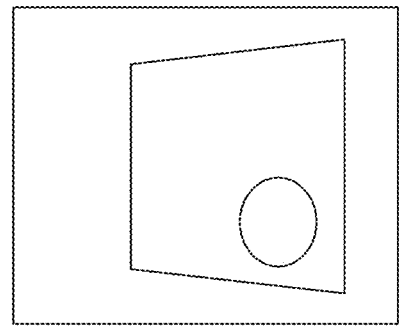
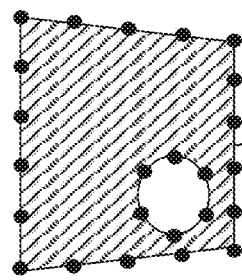
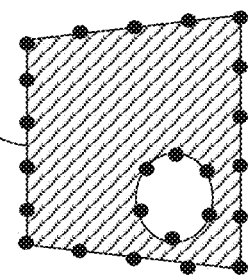
MODEL PATTERN
TRANSFORMED
TO SUIT IMAGE

FIG. 8

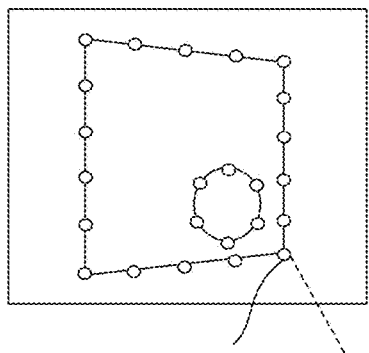

IMAGE WHICH IS CAPTURED BY
FIRST CAMERA 4A AND FROM
WHICH EDGE LINE IS EXTRACTED

CORRESPONDING POINT
CORRESPONDING TO
MODEL FEATURE POINT Pi

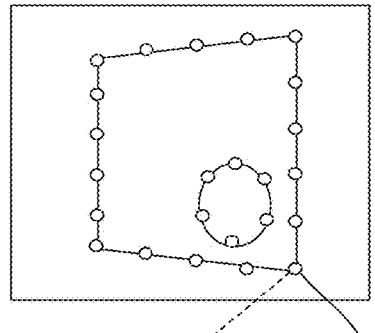

IMAGE WHICH IS CAPTURED BY
SECOND CAMERA 4B AND FROM
WHICH EDGE LINE IS EXTRACTED

CORRESPONDING POINT
CORRESPONDING TO
MODEL FEATURE POINT Pi

CORRESPONDING POINT SET
(SET OF CORRESPONDING POINTS ON PIECES OF
IMAGE DATA CORRESPONDING TO IDENTICAL
MODEL FEATURE POINT OF MODEL PATTERN)

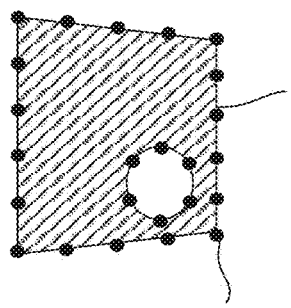
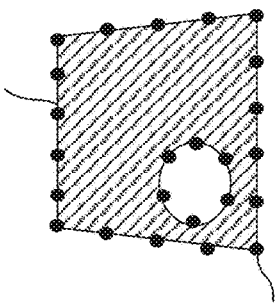

TRANSFORMED
MODEL PATTERN

MODEL
FEATURE POINT
Pi

MODEL
FEATURE POINT
Pi

FIG. 9
IMAGE WHICH IS CAPTURED BY FIRST CAMERA 4A AND FROM WHICH EDGE LINE IS EXTRACTED
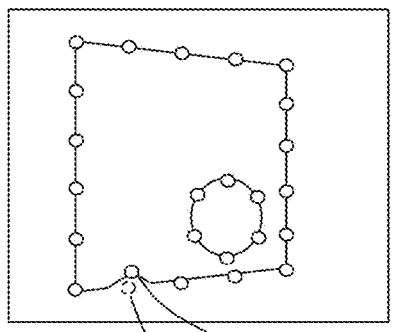
CORRESPONDING POINT
IMAGE WHICH IS CAPTURED BY SECOND CAMERA 4B AND FROM WHICH EDGE LINE IS EXTRACTED
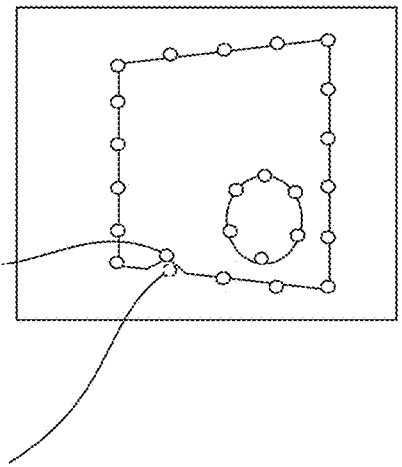
CORRESPONDING POINT
MODEL FEATURE POINT IS NOT SUPERIMPOSED ON EDGE PORTION OF IMAGE OF OBJECT ON IMAGE DATA
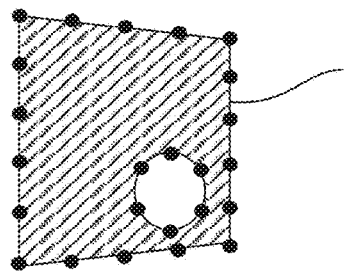
TRANSFORMED MODEL PATTERN
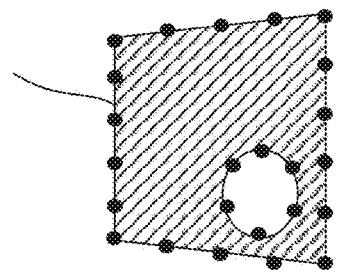

FIG. 10
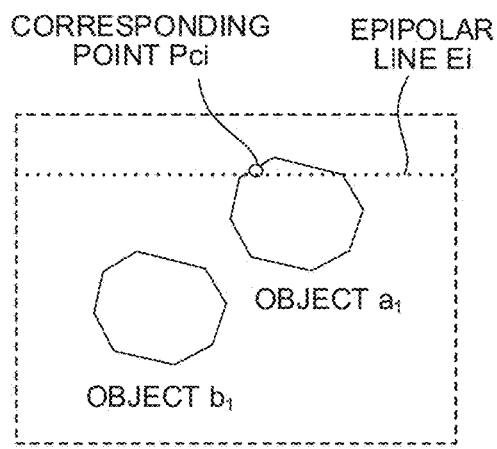
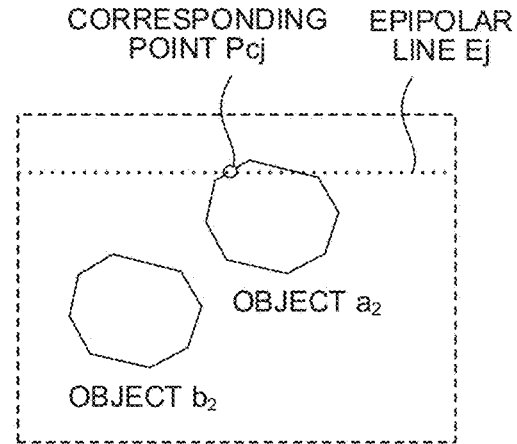
FIG. 11
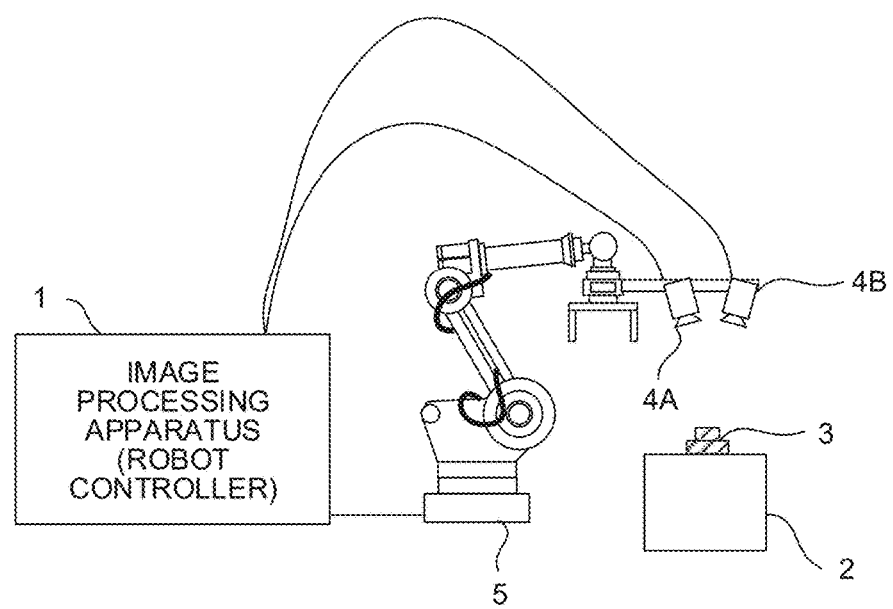

IMAGE PROCESSING APPARATUS AND IMAGE PROCESSING METHOD

RELATED APPLICATIONS

The present application claims priority to Japanese Patent Application Number 2018-176026 filed Sep. 20, 2018, the disclosure of which is hereby incorporated by reference herein in its entirety.

BACKGROUND OF THE INVENTION

1. Field of the Invention

The present invention relates to an image processing apparatus and an image processing method and, more particularly, to an image processing apparatus and an image processing method for obtaining, from feature points of an object which are detected from input images associated with the object captured by a plurality of cameras, a three-dimensional position of each feature point.

2. Description of the Related Art

If an image of a particular object is detected from an image within a field of view of a camera, using an image processing apparatus, feature quantity matching is performed between reference information (which is generally referred to as a model pattern, a template, or the like and will hereinafter be referred to as a "model pattern") representing the object and an input image acquired by an image capturing apparatus. If a result of the feature quantity matching shows that the degree of coincidence exceeds a predetermined level, it is generally judged that object detection is successfully done.

At the time of such matching processing between a model pattern and an input image, an edge point may be regarded as one of feature points which represent features of an image. FIG. 14 is a view showing an example with an object to be detected within an image (within a model pattern region) and edge points. An edge point is a point on the image where the amount of change in luminance is large. An image of contour lines of an object to be detected generally has a high luminance gradient. For this reason, contour line shape matching for an object to be detected is performed by using edge points as feature quantities. A group of edge points extracted from an image including an object which is to be detected is stored in advance as a model pattern, and object detection is performed on the basis of the degree of coincidence between a group of edge points extracted from an input image acquired by an image capturing apparatus and the group of edge points of the model pattern. For example, the generalized Hough transform is known as an approach of this kind.

For example, Japanese Patent Application Laid-Open No. 2017-091079 discloses a prior art technique for detecting an object from an image, as described above. In the prior art technique described in Japanese Patent Application Laid-Open No. 2017-091079, a model pattern obtained through capturing by a camera is superimposed on an input image. Additionally, matching between edge points of the model pattern and edge points of the input image is performed. In addition, edge points of the input image corresponding to edge points constituting the model pattern are selected. With this selection, an object is detected. In the technique disclosed in Japanese Patent Application Laid-Open No. 2017-091079, a position and posture (vector quantity) of each edge point of the model pattern is modified such that a shape formed by edge points of the model pattern is an average shape for an image of an object showing up in the input image at the time of superimposition of a model pattern on an input image.

Japanese Patent Application Laid-open No. 2016-061687 discloses a technique pertaining to an image processing apparatus for measuring contour lines of an object using a stereo camera. In the technique described in Japanese Patent Application Laid-open No. 2016-061687, a reference contour line is projected onto an imaging surface of each of cameras of the stereo camera from three-dimensional shape data of an object. Edge lines are then extracted from respective images captured by the cameras of the stereo camera. Further, edge points which are each an intersection of an epipolar line and an edge line are obtained, and edge points corresponding to the identical part of the reference contour line are selected as corresponding points from among edge points of the respective images from the cameras. Finally, calculation (stereo calculation) is performed on the basis of the corresponding points, and a position of a three-dimensional point is obtained.

A two-dimensional camera is generally used as a vision sensor used to detect an object when a robot performs operation. A position (a position of an edge, a position of a feature point, or the like) of a detected object is expressed in an image coordinate system. For this reason, in order for operation to be performed on an object detected by a vision sensor, a two-dimensional position (coordinates) of the object expressed in the image coordinate system needs to be transformed into a three-dimensional (coordinate) position expressed in a robot coordinate system. To implement this, a position (coordinates) of the object on an image is projected onto a specific plane on the assumption that a position of the detected object is present on the specific plane.

In the above-described case, the specific plane, onto which the position of the object is to be projected, needs to be accurately obtained. For example, three-dimensional positions of three points on a plane are obtained by a three-dimensional vision sensor or by a robot through a touch to the three points. The plane is calculated from information on the positions of the three points. This case, however, needs a special sensor. The case also causes the problem of extra trouble with setup. If a position and posture of the object changes three-dimensionally, a position and posture of the specific plane also changes with the change. This causes the need to perform plane detection each time. As a result, object detection takes time.

Under the above-described circumstances, an object of the present disclosure is to provide an image processing apparatus and an image processing method capable of obtaining a three-dimensional position of a detected object from input images associated with the object captured by at least one camera.

SUMMARY OF THE INVENTION

An image processing apparatus and an image processing method according to the present disclosure solve the above-described problems by specifying a correspondence relationship between parts of images of an object to be detected showing up in a plurality of captured images (a stereo image) associated with the object to be detected using a plurality of feature points of a model pattern for an object to be detected and obtaining a three-dimensional position of the object to be detected on the basis of the specified correspondence relationship between the parts of the images of the object to be detected.

According to one aspect of the present invention, there is provided an image processing apparatus for obtaining, from a plurality of images of an object to be detected captured by at least one camera, a three-dimensional position of each of feature points of the object to be detected. The image processing apparatus includes: a model pattern storage unit that stores a model pattern composed of a plurality of model feature points for the object to be detected; an image data acquisition unit that acquires a plurality of images obtained through capturing the identical object to be detected by the camera; a feature point extraction unit that extracts first feature points from the plurality of images; an object detection unit that detects images of the object to be detected from the plurality of images by performing matching between the first feature points extracted from the plurality of images and the model pattern stored in the model pattern storage unit; a model pattern transformation unit that transforms a position and posture of each of the model feature points of the model pattern such that the model feature points of the model pattern are superimposed on the image of the object to be detected in each of the plurality of images detected by the object detection unit; a corresponding point acquisition unit that acquires, as a corresponding point, a point on the image corresponding to each of the model feature points of the model pattern transformed by the model pattern transformation unit; a corresponding point set selection unit that selects, as a corresponding point set, corresponding points obtained on the basis of an identical one of the model feature points from among corresponding points obtained for the respective images of the object to be detected of the plurality of images; and a three-dimensional position calculation unit that calculates the three-dimensional position of each of the feature points of the object to be detected on the basis of the corresponding point set selected by the corresponding point set selection unit.

According to another aspect of the present invention, there is provided an image processing method for obtaining, from a plurality of images of an object to be detected captured by at least one camera, a three-dimensional position of each of feature points of the object to be detected. The image processing method includes: a first step of acquiring a plurality of images obtained through capturing the identical object to be detected by the camera; a second step of extracting first feature points from the plurality of images; a third step of detecting images of the object to be detected from the plurality of images by performing matching between the first feature points extracted from the plurality of images and a model pattern composed of a plurality of model feature points for the object to be detected; a fourth step of transforming a position and posture of each of the model feature points of the model pattern such that the model feature points of the model pattern are superimposed on the image of the object to be detected in each of the plurality of images detected in the third step; a fifth step of acquiring a point corresponding to each of the model feature points of the model pattern transformed in the fourth step; a sixth step of selecting, as a corresponding point set, corresponding points obtained on the basis of an identical one of the model feature points from among corresponding points obtained for the respective images of the object to be detected of the plurality of images; and a seventh step of calculating the three-dimensional position of each of the feature points of the object to be detected on the basis of the corresponding point set selected in the sixth step.

According to the present invention, it is possible to obtain a three-dimensional position of an object which is detected from respective images of input images associated with the object captured by a plurality of cameras.

BRIEF DESCRIPTION OF THE DRAWINGS

The above and other objects and features of the present invention will become more apparent from the following description of exemplary embodiments with reference to the accompanying drawings, in which:

FIG. 6 is a view showing an example where the object is detected from two images;

FIG. 7 is a view showing an example where a model pattern is transformed;

FIG. 8 is a view showing an example where corresponding points on the object which are detected from the two images are selected;

FIG. 9 is a view showing an example where corresponding points on an object are selected, according to another embodiment;

FIG. 10 is a view showing an example where a correspondence relationship among a plurality of objects in two images is specified;

FIG. 11 is a view showing a configuration of an image processing apparatus according to another embodiment;

DETAILED DESCRIPTION OF THE PREFERRED EMBODIMENTS

Embodiments of the present invention will be described below with reference to the drawings.

Figure 1:
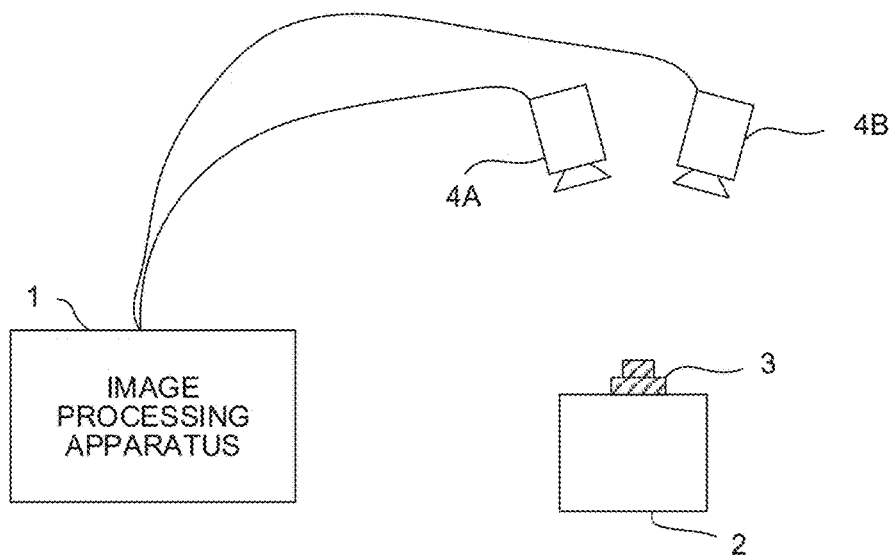
FIG. 1 is a diagram showing a configuration of an image processing apparatus according to one embodiment.

FIG. 1 is a diagram showing a configuration of an image processing apparatus 1 according to one embodiment of the present invention. The image processing apparatus 1 is connected to at least two cameras 4 (a first camera 4A and a second camera 4B as one pair in the present embodiment) which capture a workpiece 3 placed on a workbench 2. The image processing apparatus 1 has a function of specifying the shape of the workpiece 3 by contour lines of the workpiece 3.

Each camera 4 is, for example, an electronic camera having an image capturing device, such as a charge coupled device (CCD). The camera 4 is a well-known light-receiving device which has a function of detecting a two-dimensional image on an imaging surface (a CCD array surface) through capturing. Note that a two-dimensional coordinate system at the imaging surface will hereinafter be called a sensor coordinate system. The first camera 4A and the second camera 4B are each supported on a mount or the like. Positions and postures of the one pair of cameras 4A and 4B in a three-dimensional world coordinate system are determined such that distance between the first camera 4A and the workpiece 3 and distance between the second camera 4B and the workpiece 3 are almost equal to each other and such that ranges almost identical to each other are shot by the first camera 4A and the second camera 4B. Note that the three-dimensional world coordinate system will hereinafter be called a robot coordinate system.

Figure 2:
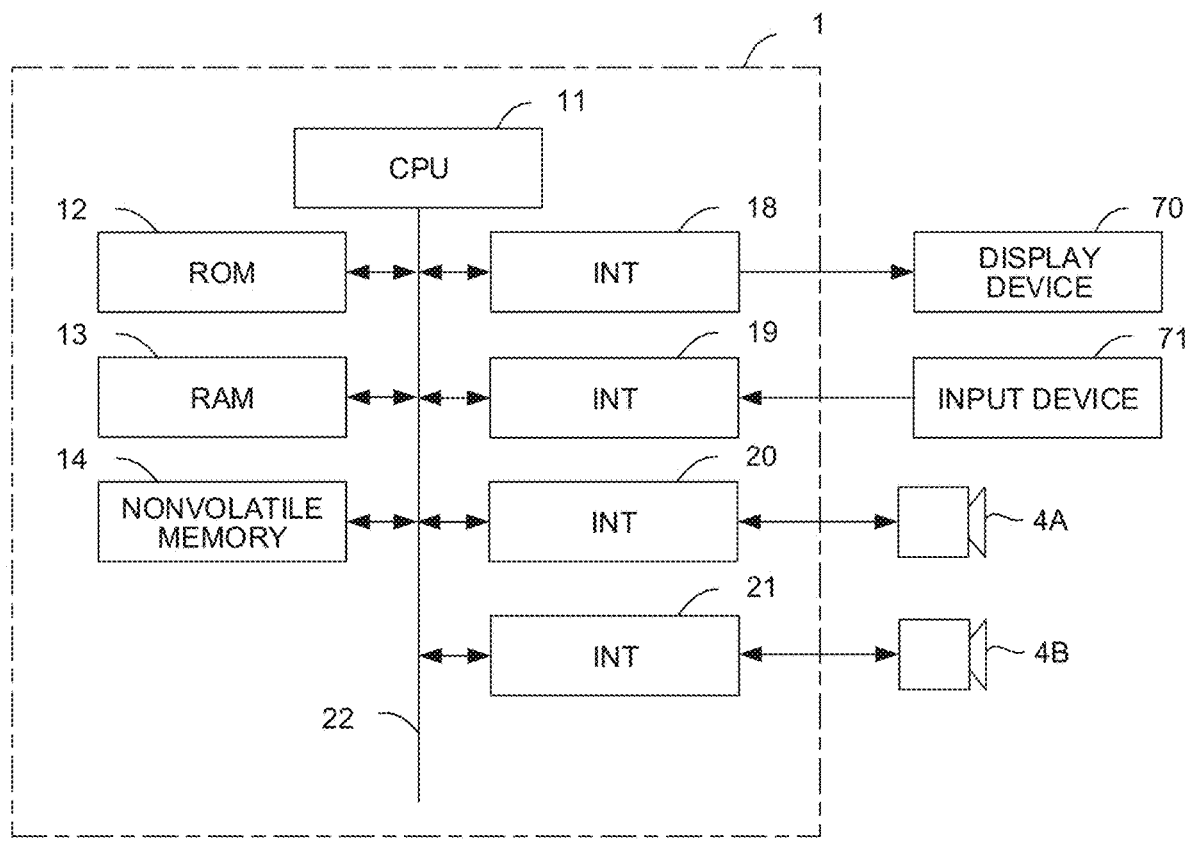
FIG. 2 is a schematic hardware configuration diagram of the image processing apparatus according to the one embodiment.

FIG. 2 is a schematic hardware configuration diagram showing the image processing apparatus 1 in FIG. 1. The image processing apparatus 1 is implemented in a controller which controls a producing machine, such as a robot or a machine tool. The image processing apparatus 1 may be implemented in a computer such as a personal computer which is provided side by side with the controller controlling the producing machine, a cell computer, a host computer, or a cloud server, which is connected to the controller via a network. FIG. 2 shows an example of a case where the image processing apparatus 1 is implemented in a personal computer which is installed side by side with a controller controlling a producing machine (robot) provided with a vision sensor.

A central processing unit (CPU) 11 which the image processing apparatus 1 according to the present embodiment includes is a processor which controls the whole of the image processing apparatus 1. The CPU 11 reads out a system program stored in a read only memory (ROM) 12 which is connected via a bus 22 and controls the whole of the image processing apparatus 1 in accordance with the system program. Temporal calculation data and display data to be displayed on a display device 70 are stored in a random access memory (RAM) 13. Various types of data which are input by an operator via an input device 71, and the like are stored in the RAM 13.

For example, a static random access memory (SRAM) or a solid state drive (SSD) which is backed up by a battery (not shown) is used as a nonvolatile memory 14. The nonvolatile memory 14 is a memory, a storage state of which is held even when the power to the image processing apparatus 1 is turned off. Data and a program which are input via the input device 71, image data acquired from the cameras 4, and the like are stored in the nonvolatile memory 14. Data, a program, or the like stored in the nonvolatile memory 14 may be loaded into the RAM 13 when used. Various types of algorithms needed for image analysis processing and the system program for execution of other necessary processing are written in advance in the ROM 12.

Figure 3:
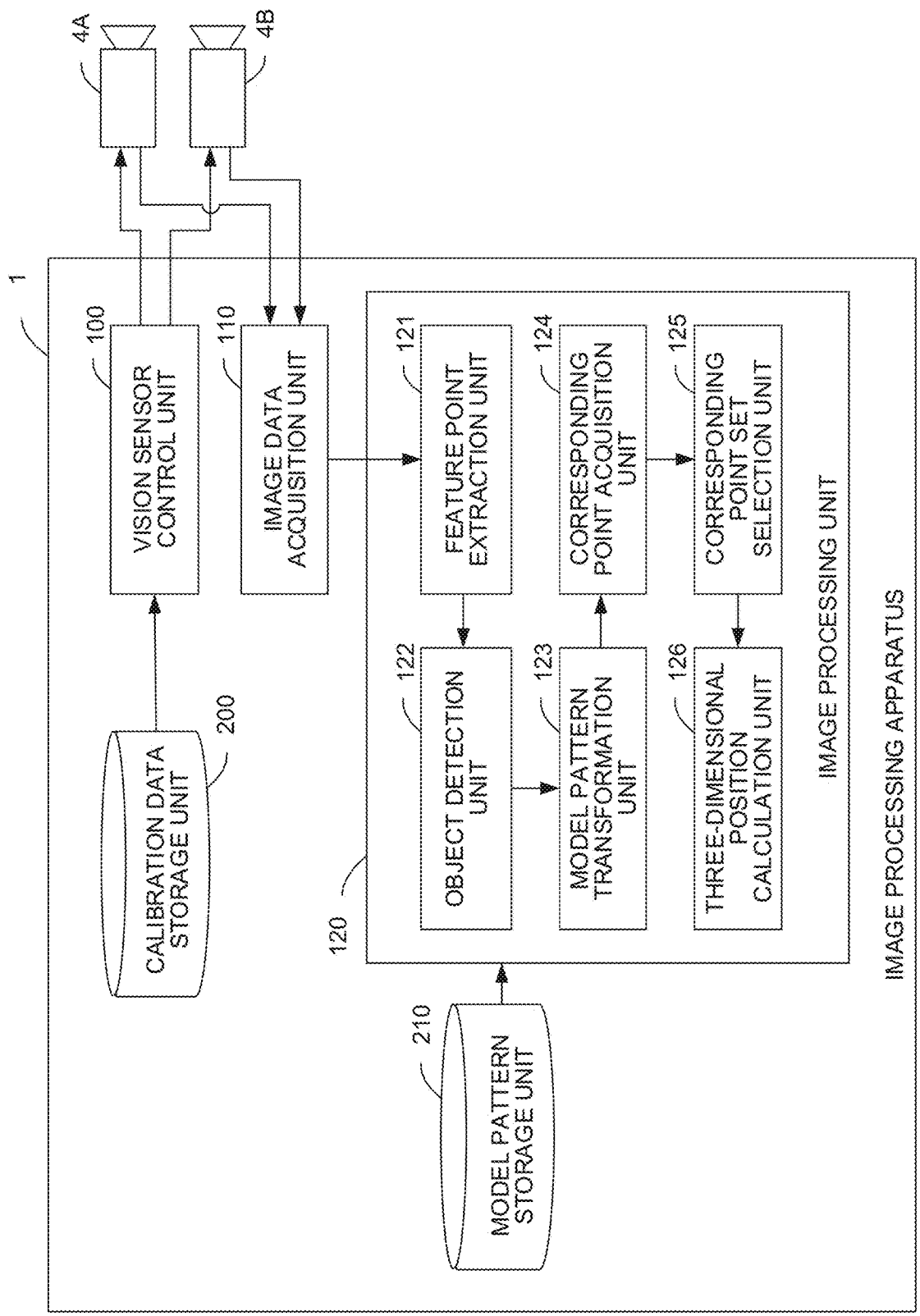
FIG. 3 is a schematic functional block diagram of the image processing apparatus according to the one embodiment.

FIG. 3 is a schematic functional block diagram of the image processing apparatus 1 according to the one embodiment. Functions of functional blocks shown in FIG. 3 are realized by the CPU 11 that the image processing apparatus 1 shown in FIG. 2 includes through executing the system program and controlling operation of each unit of the image processing apparatus 1.

The image processing apparatus 1 according to the present embodiment includes a vision sensor control unit 100, an image data acquisition unit 110, and an image processing unit 120. A calibration data storage unit 200 which stores respective pieces of calibration data for the first camera 4A and the second camera 4B and a model pattern storage unit 210 which stores a model pattern are secured in a storage region of the nonvolatile memory 14.

Figure 14:
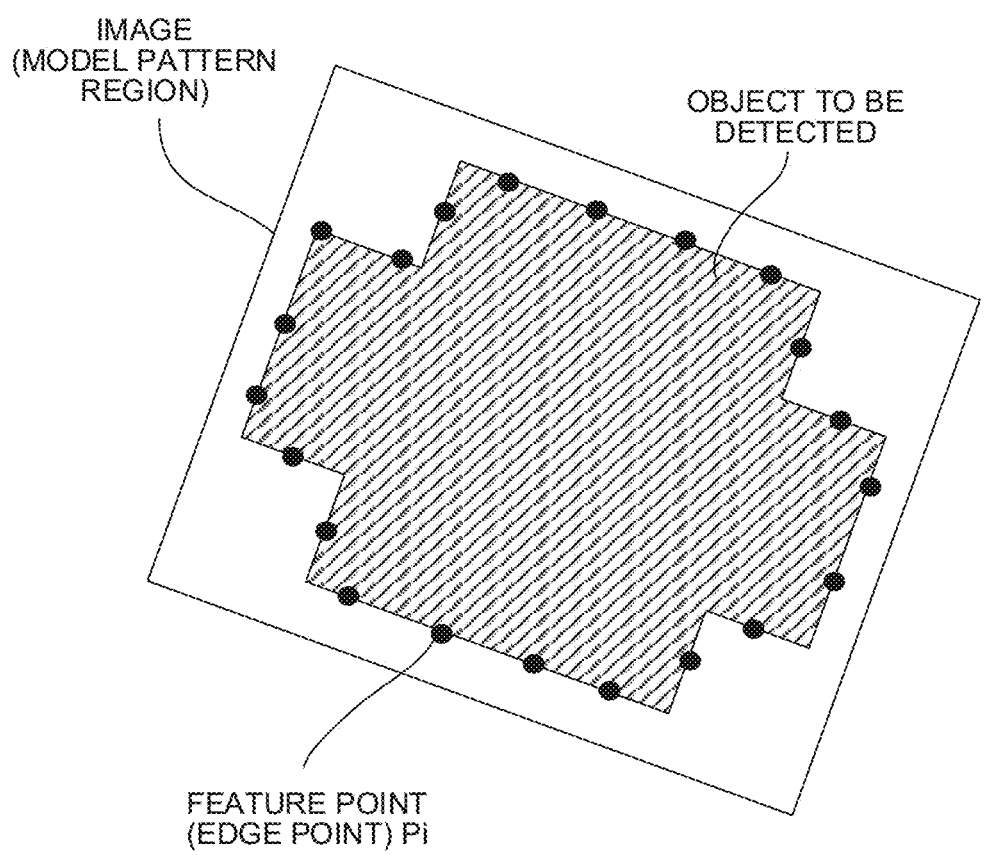
FIG. 14 is a view showing an example with an object to be detected and edge points within an image.

In the present embodiment, at least one model pattern for an object is stored in advance in the model pattern storage unit 210. As illustrated in FIG. 14, a model pattern is composed of a plurality of feature points Pi (i=1 to n) (hereinafter referred to as model feature points) on an edge in an image when an object is viewed from a direction, in which the first camera 4A or the second camera 4B is arranged, at the time of detection.

A model pattern is created, for example, by the procedure below.

Step a1) An object which is to be taught as a model pattern is arranged within a field of view of a camera, and an image of the object is captured. A positional relationship between the camera and the object that is to be taught as a model pattern at this time is desirably identical to one when the object (an object to be detected) is detected.

Step a2) In the image captured in step a1, a region where the object shows up is designated with a frame in the shape of a rectangle, a circle, or the like. The designated region is called a model pattern designation region.

Step a3) Edge points are extracted from the model pattern designation region, and physical quantities, such as a position, a posture (the direction of a luminance gradient), and the magnitude of the luminance gradient of each edge point, are obtained. A model pattern coordinate system is defined within the model pattern designation region, and the position and posture of each edge point are transformed from values expressed in an image coordinate system into values expressed in the model pattern coordinate system.

Step a4) The physical quantities, such as the positions, the postures (the directions of the luminance gradients), and the magnitudes of the luminance gradients of the extracted edge points, are stored as model feature points Pi constituting a model pattern in a model pattern storage unit.

Step a5) If the generated model pattern needs to be modified, an operator performs the operation of modifying the model pattern. For example, the operator removes an unnecessary model feature point (a noise or a feature point not on an identical plane) and changes an origin of the model pattern coordinate system.

A model pattern is also created by a method other than creation from an image captured by a camera by the above-described procedure. For example, a model pattern is generated from a figure, such as a circle or a rectangle. Alternatively, a model pattern may be created by projecting three-dimensional shape data, such as CAD data, onto an appropriate plane.

For example, three-dimensional CAD data is transformed into a model pattern by the processing below.

Step b1) A local coordinate system with an origin placed on an imaging surface of a camera is defined.

Step b2) The camera is calibrated in advance. A three-dimensional point expressed in the local coordinate system is transformed into a two-dimensional point on a camera image.

Step b3) An object expressed as CAD data is virtually arranged in the local coordinate system. The arranged CAD data is expressed in the local coordinate system. A relative relationship between the camera and the object expressed as the CAD data is set so as to be substantially identical to a relative relationship at the time of actual detection of the object (an object to be detected).

Step b4) A group of three-dimensional points which are at predetermined intervals on contour lines is acquired. Contour lines used as a model pattern are designated from the CAD data, as needed.

Step b5) The group of three-dimensional points is projected onto a camera image to obtain a group of two-dimensional points in an image coordinate system. If the direction of a light and dark pattern is designated on the CAD data, the direction of a luminance gradient may be added. The direction of a light and dark pattern here indicates which one of two regions divided by a contour line as a boundary therebetween is lighter.

Step b6) The obtained group of two-dimensional points in the image coordinate system is transformed so as to be expressed in a model pattern coordinate system and is stored as model feature points in a model pattern storage unit.

The vision sensor control unit 100 is functional means for controlling the first camera 4A and the second camera 4B on the basis of a program or an operation through the input device 71 or a console panel (not shown). Control operation on the first camera 4A and the second camera 4B by the vision sensor control unit 100 includes at least calibration control and object capturing control of the first camera 4A and the second camera 4B.

The vision sensor control unit 100 reads out respective pieces of calibration data for the first camera 4A and the second camera 4B from the calibration data storage unit 200 in accordance with the program or a calibration instruction operation from the input device 71 or the console panel (not shown). The vision sensor control unit 100 calibrates the first camera 4A and the second camera 4B on the basis of the read-out pieces of calibration data. Various publicly known approaches are proposed regarding the format of calibration data stored in the calibration data storage unit 200 and a method for obtaining the calibration data. Any approach may be used in the present embodiment. For example, Roger Y. Tsai, "An efficient and accurate camera calibration technique for 3D machine vision", Proc. Computer Vision and Pattern Recognition '86, pp. 364-374, 1986 is available as an example of a document describing the details of a camera calibration method. With the calibration of the first camera 4A and the second camera 4B by the vision sensor control unit 100, when a three-dimensional point (hereinafter referred to as a gaze point) in the robot coordinate system is given, a position of an image on a camera image of the three-dimensional point, that is, a two-dimensional point in a sensor coordinate system is calculated. Additionally, when a two-dimensional point in the sensor coordinate system which is an image of a given gaze point is given, a line of sight (a three-dimensional straight line passing through the gaze point and a focal point of a camera) in the robot coordinate system can be calculated.

If calibration data is obtained for each of the one pair of cameras 4A and 4B, when a three-dimensional position of a gaze point in the robot coordinate system is given, a plane passing through the gaze point, a focal point of the first camera 4A, and a focal point of the second camera 4B, that is, an epipolar plane can be calculated. Additionally, if an image of the gaze point is given as a two-dimensional point in the sensor coordinate system of the first camera 4A and a two-dimensional point in the sensor coordinate system of the second camera 4B, a position of the gaze point in the robot coordinate system can be specified, and three-dimensional position coordinates of the gaze point can be calculated.

The vision sensor control unit 100 performs control such that the first camera 4A and the second camera 4B each capture an object (for example, a workpiece), on the basis of the program or a capturing instruction operation from the input device 71 or the console panel (not shown). As described above, the first camera 4A and the second camera 4B are arranged such that the distances to the workpiece 3 are almost equal to each other and such that ranges almost identical to each other are shot by the first camera 4A and the second camera 4B. Respective lenses of the first camera 4A and the second camera 4B are oriented toward a center of the workpiece 3. For this reason, for example, if the first camera 4A and the second camera 4B each capture the workpiece 3 illustrated in FIG. 4, images of respective ranges viewed from the cameras and indicated by dotted lines, that is, images inclined with respect to a workpiece upper surface are captured. Note that the cameras may be arranged parallel to each other such that positions of an object which are to be captured by the cameras are slightly shifted.

The image data acquisition unit 110 acquires respective pieces of image data obtained through capturing by the first camera 4A and the second camera 4B under control of the vision sensor control unit 100 and outputs the pieces of image data to the image processing unit 120. Respective images captured by the first camera 4A and the second camera 4B which are acquired by the image data acquisition unit 110 are images when an identical object is viewed from the cameras, as illustrated in, for example, FIG. 5.

The image processing unit 120 is functional means for performing image processing on image data acquired by the image data acquisition unit 110. The image processing unit 120 includes a feature point extraction unit 121, an object detection unit 122, a model pattern transformation unit 123, a corresponding point acquisition unit 124, a corresponding point set selection unit 125, and a three-dimensional position calculation unit 126.

The feature point extraction unit 121 is functional means for extracting edge points (first feature points) from image data obtained through capturing an object by each of the first camera 4A and the second camera 4B. An edge point is a point in a captured image where the amount of change in luminance value is large. An approach that detects a part with a large change in luminance value of an image, such as the Sobel filter or the Canny edge detector, is publicly known as an edge point extraction method. The feature point extraction unit 121 may extract edge points in each image data by such a publicly known approach.

Figure 5:
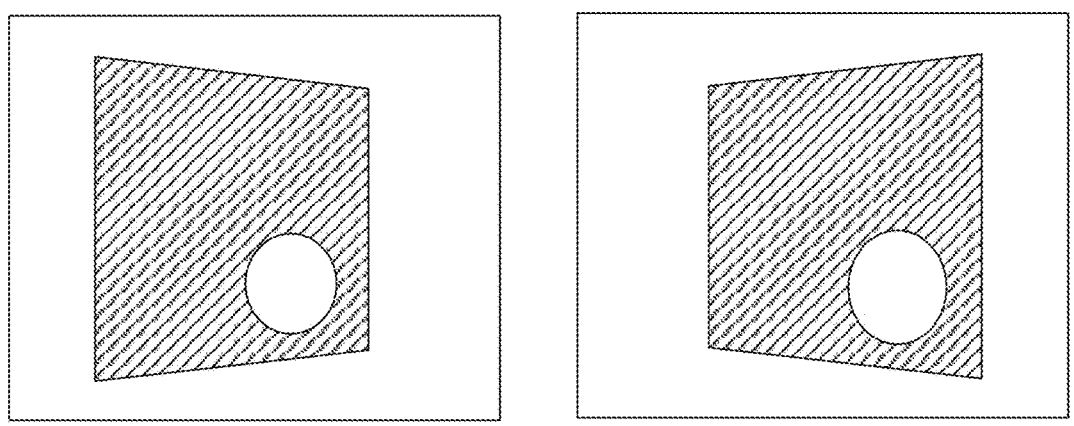
FIG. 5 is a view showing an example of images of the object to be detected which are captured by two cameras.

The object detection unit 122 is functional means for performing matching processing between edge points extracted by the feature point extraction unit 121 and model feature points Pi of a model pattern stored in the model pattern storage unit 210 and detecting an object in image data. The object detection unit 122 acquires a model pattern for an object from the model pattern storage unit 210. The object detection unit 122 performs object detection using, for example, the generalized Hough transform, the RANSAC or ICP algorithm, or the like that is publicly known on the basis of model feature points of the acquired model pattern and edge points (first feature points) extracted by the feature point extraction unit 121. The object detection unit 122 performs matching processing between each of respective pieces of image data, (edge points of which are extracted), which are obtained from the first camera 4A and the second camera 4B and a model pattern common to the pieces of image data, as illustrated in FIG. 6. With this matching processing, the object detection unit 122 detects an object from each piece of image data. FIGS. 5 and 6 each show states where an object is greatly inclined with respect to an image depth direction in order to clarify a difference between an image captured by the first camera 4A and an image captured by the second camera 4B. However, an inclination with respect to the depth direction in each image is actually insignificant. For this reason, a high degree of similarity is calculated by matching processing between edge points of the object in each image and model feature points of a model pattern by the object detection unit 122. As a result, an image of the object is extracted from each image without any special problem.

Figure 4:
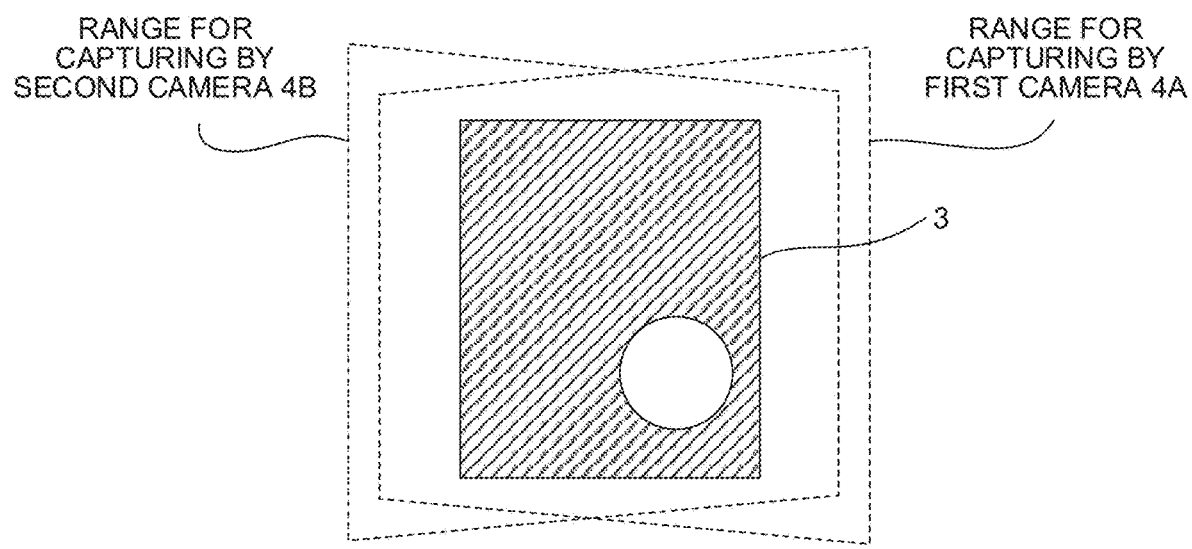
FIG. 4 is a view showing an example of an object to be detected.

The model pattern transformation unit 123 transforms a model pattern such that the model pattern can be superimposed on an object in image data obtained from each of the first camera 4A and the second camera 4B, in accordance with positions, postures, and the like of edge points of the object, which are detected by the object detection unit 122, in the image data. The model pattern transformation unit 123 changes positions and postures of model feature points constituting the model pattern at the time of the transformation of the model pattern. For example, if images as illustrated in FIG. 4 are captured, the first camera 4A and the second camera 4B are arranged slightly inclined to the left and to the right, respectively, with respect to an object. For this reason, the model pattern transformation unit 123 performs congruent transformation, similarity transformation, or the like such that each feature point when model feature points of a model pattern are projected onto a plane of projection is substantially superimposed on an edge point of an object in image data if the model pattern is arranged in a three-dimensional space, as shown in, for example, FIG. 7. The model pattern transformation unit 123 may output model feature points of the transformed model pattern projected onto the plane of projection as a transformation result. Note that since a model pattern transformation method is already publicly known by Japanese Patent Application Laid-Open No. 2017-091079 and the like, a more detailed description thereof will be omitted in the present specification.

The corresponding point acquisition unit 124 is functional means for acquiring positions on respective pieces of image data obtained from the first camera 4A and the second camera 4B corresponding to a model feature point of a model pattern transformed by the model pattern transformation unit 123 (the model feature point of the model pattern on each piece of image data) as corresponding points. A position on image data to be acquired by the corresponding point acquisition unit 124 (a model feature point of the model pattern on the image data) may be a position on the image data which overlaps with each model feature point when model feature points of the model pattern transformed by the model pattern transformation unit 123 are superimposed on an image of an object on the image data, as illustrated in, for example, FIG. 8.

The corresponding point set selection unit 125 is functional means for selecting, as a set, corresponding points obtained on the basis of an identical model feature points from among corresponding points on pieces of image data acquired by the corresponding point acquisition unit 124. The corresponding point set selection unit 125 selects, as one corresponding point set, a corresponding point on image data obtained through capturing by the first camera 4A corresponding to a model feature point Pi and a corresponding point on image data obtained through capturing by the second camera 4B corresponding to the model feature point Pi, as illustrated in, for example, FIG. 8. The corresponding point set selection unit 125 selects corresponding point sets corresponding to all of model feature points of a model pattern in the above-described manner.

The three-dimensional position calculation unit 126 calculates a three-dimensional position of each corresponding point by, for example, the publicly known principle of triangulation on the basis of a plurality of corresponding point sets in images of an object in respective pieces of image data obtained from the first camera 4A and the second camera 4B, the plurality of corresponding point sets being selected by the corresponding point set selection unit 125.

With the above-described configuration, the image processing apparatus 1 according to the present embodiment is capable of obtaining a three-dimensional position of a feature point of an object detected from input images associated with the object which are captured by the first camera 4A and the second camera 4B. This allows accurate grasping of a three-dimensional position and a posture of an object. For example, an object three-dimensionally shifted in position can be gripped with a hand of a robot.

The embodiment of the present invention has been described above. The present invention, however, is not limited to the above-described example of the embodiment and is performed in various forms by being appropriately changed.

The above-described embodiment has illustrated an example where the two cameras 4 are used. As another embodiment, an object may be captured by three or more cameras 4, the above-described processing may be executed on three or more pieces of image data obtained as a result of the capturing, and a three-dimensional position of a corresponding point of the object in each piece of image data may be obtained. This allows obtaining a three-dimensional position and posture of an object. Use of information on three-dimensional positions and postures of many corresponding points reduces an error in estimation of a position and posture of an object.

In the above-described embodiment, a three-dimensional position is calculated using a point on image data corresponding to each of model feature points constituting a model pattern. This method may be incapable of calculating three-dimensional information on a correct position of an image of an object if the detected object is chipped or distorted, and a model pattern and the object are different from each other in shape. For this reason, as another embodiment, if there is a point which is not superimposed on an edge portion of an image of an object in image data among model feature points Pi of a model pattern, a first feature point near the model feature point may be searched for, and a found first feature point may be regarded as a corresponding point, as illustrated in FIG. 9.

The corresponding point acquisition unit 124 may acquire, as a corresponding point, an intersection of a nearby epipolar line when a model feature point transformed by the model pattern transformation unit 123 is superimposed onto image data and a line extending from first feature points adjacent to the model feature point to the epipolar line.

By the processing illustrated in the above-described embodiment alone, the object detection unit 122 may be incapable of coping with a situation where the plurality of first feature points which match a model pattern are detected from first feature points extracted by the feature point extraction unit 121 (for example, a situation where a plurality of objects are detected at one time), as illustrated in, for example, FIG. 10. For this reason, as another embodiment, each of two or more objects showing up in each image may also be associated by executing processing based on publicly known epipolar geometry in a corresponding point set selection unit 125. At the time of association of each of two or more objects showing up in each image by processing based on epipolar geometry, for example, the procedure below may be executed. Note that the procedure below assumes a case where two objects a1 and b1 and two objects a2 and b2 are respectively detected in image data acquired from a first camera 4A and image data acquired from a second camera 4B.

Step c1) One (the object a1 in FIG. 10) of objects detected from the image data acquired by the first camera 4A is selected.

Step c2) A model pattern is superimposed on the object selected in step c1, and corresponding points are acquired. One (a corresponding point Pci in FIG. 10) of the corresponding points is selected.

Step c3) An epipolar line (an epipolar line Ei in FIG. 10) passing through the feature point selected in step c2 is calculated.

Step c4) An epipolar line (an epipolar line Ej in FIG. 10) in the image data acquired by the second camera 4B which passes through an epipolar plane overlapping with the epipolar line calculated in step c3 is calculated.

Step c5) If the corresponding point (the feature point Pci in FIG. 10) on the object, through which the epipolar line calculated in step c3 passes, and a corresponding point (a feature point Pcj in FIG. 10) on an object, through which the epipolar line calculated in step c4 passes, correspond to an identical model feature point of the model pattern (that is, if positions on the objects corresponding to the identical model feature point of the model pattern are on an identical epipolar plane), the objects may be objects corresponding to each other.

Step c6) The above-described steps are performed on all of model feature points of the model pattern, and objects which are highly likely to correspond to each other (for example, objects with many corresponding point sets which are each on an identical epipolar plane, or objects with many corresponding point sets which are each on an identical epipolar line) are specified.

The above-described embodiment shows an example where each camera 4 is fixed on a mount or the like. As another embodiment, an image processing apparatus 1 according to the present disclosure is also used in a system in which a stereo camera (with a first camera 4A and a second camera 4B) is attached to an end effector of a robot 5, as illustrated in, for example, FIG. 11. The stereo camera moves in step with operation of a tip arm portion of the robot 5 while keeping a position relative to the tip arm portion constant, when an arm of the robot 5 is moved. If this system is used, for example, the image processing apparatus 1 may be implemented in a robot controller which controls the robot 5. Alternatively, the image processing apparatus 1 may be implemented in a personal computer or the like provided side by side with the robot controller.

Figure 12:
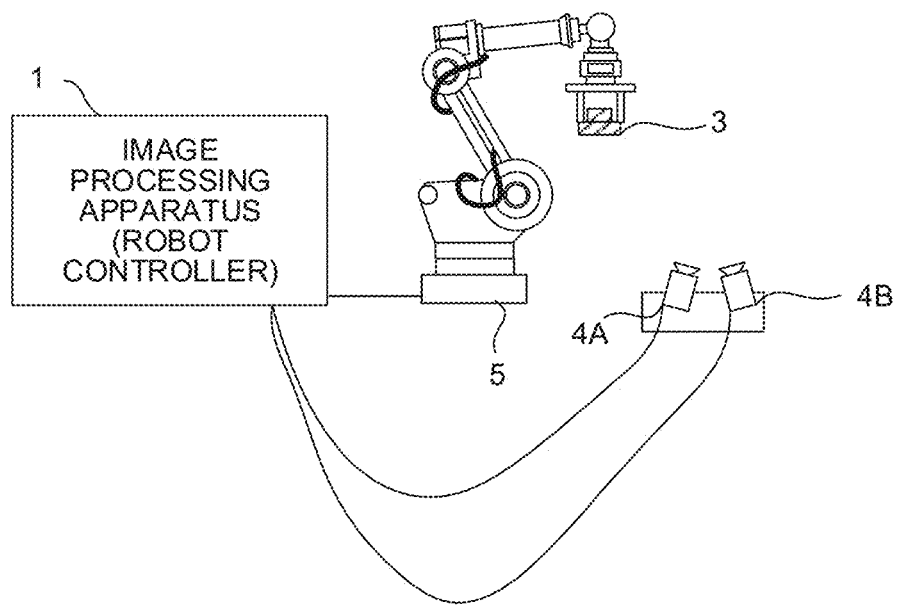
FIG. 12 is a view showing a configuration of an image processing apparatus according to another embodiment.

As illustrated in FIG. 12, an image processing apparatus 1 according to the present invention is used even in a system which grips a workpiece 3 as an object to be detected with a hand of a robot 5. In this system, a stereo camera (with a first camera 4A and a second camera 4B) is fixed on a workbench or the like. The workpiece 3 moves in step with operation of a tip arm portion of the robot 5 while keeping a position relative to the tip arm portion constant, when an arm of the robot 5 is moved.

Figure 13:
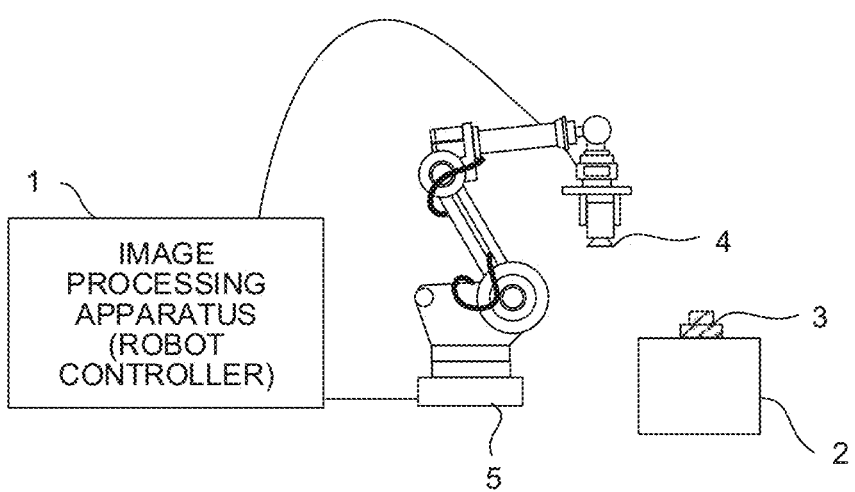
FIG. 13 is a view showing a configuration of an image processing apparatus according to another embodiment.

As illustrated in FIG. 13, an image processing apparatus 1 according to the present invention is used even in a system in which a single camera 4 is attached to an end effector of a robot 5. In this case, the camera 4 moves in step with operation of a tip arm portion of the robot 5 while keeping a position relative to the tip arm portion constant, when an arm of the robot 5 is moved. The camera 4 is moved to a plurality of sites and captures an object. This configuration exhibits the same effect as in a case where a stereo camera is used.

The invention claimed is:

1. An image processing apparatus for obtaining, from a plurality of images of an object to be detected and captured by at least one camera, a three-dimensional position of each of feature points of the object to be detected, the image processing apparatus comprising:
   a model pattern storage unit configured to store a model pattern composed of a plurality of model feature points for the object to be detected;
   an image data acquisition unit configured to acquire a plurality of images obtained through capturing the identical object to be detected by the at least one camera;
   a feature point extraction unit configured to
      extract first feature points from a first image among the plurality of images, and
      extract second feature points from a second image among the plurality of images;
   an object detection unit configured to detect images of the object to be detected from the first image and the second image by performing matching between the first feature points extracted from the first image and the second feature points extracted from the second image, and the model pattern stored in the model pattern storage unit;
   a model pattern transformation unit configured to transform a position and posture of each of the plurality of model feature points of the model pattern such that the plurality of model feature points of the model pattern is superimposed on an image of the images of the object to be detected in each of the first image and the second image detected by the object detection unit;
   a corresponding point acquisition unit configured to acquire, as first corresponding points and second corresponding points, points on the first image and the second image corresponding to each of the plurality of model feature points of the model pattern transformed by the model pattern transformation unit;
   a corresponding point set selection unit configured to select, as a corresponding point set, a first corresponding point and a second corresponding point obtained on the basis of an identical one of the plurality of model feature points from among the first corresponding points and the second corresponding points obtained for the respective first image and second image of the object to be detected of the plurality of images; and
   a three-dimensional position calculation unit configured to calculate the three-dimensional position of each of the feature points of the object to be detected on the basis of the corresponding point set selected by the corresponding point set selection unit.

2. The image processing apparatus according to claim 1, wherein
   the corresponding point acquisition unit is configured to acquire, as a corresponding point, each of the plurality of model feature points of the model pattern transformed by the model pattern transformation unit.

3. The image processing apparatus according to claim 1, wherein
   the corresponding point acquisition unit is configured to in response to one of the plurality of model feature points not being superimposed on the image of the images of the object, search for a first feature point among the first feature points and a second feature point among the second feature points near said one of the plurality of model feature points of the model pattern transformed by the model pattern transformation unit, and acquire the first feature point and the second feature point as the first corresponding point and the second corresponding point, respectively.

4. The image processing apparatus according to claim 1, wherein the corresponding point acquisition unit is configured to acquire, for each of the plurality of model feature points of the model pattern transformed by the model pattern transformation unit, an intersection of an epipolar line near a model feature point of the plurality of model feature points and a line extending from the first feature points adjacent to the model feature point to the epipolar line as the first corresponding point; and the corresponding point acquisition unit is configured to acquire, for each of the plurality of model feature points of the model pattern transformed by the model pattern transformation unit, an intersection of an epipolar line near a model feature point of the plurality of model feature points and a line extending from the second feature points adjacent to the model feature point to the epipolar line as the second corresponding point.

5. The image processing apparatus according to claim 1, wherein in response to the object detection unit detecting a plurality of objects to be detected in each of the first image and the second image, the corresponding point set selection unit is configured to regard, as identical objects to be detected, objects having an identical one of the model feature points of the model pattern which are on an identical epipolar plane.

6. The image processing apparatus according to claim 1, wherein the model pattern is generated from an input image obtained through capturing the object to be detected.

7. The image processing apparatus according to claim 1, wherein the model pattern is generated from three-dimensional shape data for the object to be detected.

8. An image processing method for obtaining, from a plurality of images of an object to be detected and captured by at least one camera, a three-dimensional position of each of feature points of the object to be detected, the image processing method comprising:

a first step of acquiring a plurality of images obtained through capturing the identical object to be detected by the at least one camera;

a second step of extracting first feature points from a first image among the plurality of images and extracting second feature points from a second image among the plurality of images;

a third step of detecting images of the object to be detected from the first image and the second image by performing matching between the first feature points extracted from the first image and the second feature points extracted from the second image, and a model pattern composed of a plurality of model feature points for the object to be detected;

a fourth step of transforming a position and posture of each of the plurality of model feature points of the model pattern such that the plurality of model feature points of the model pattern is superimposed on an image of the images of the object to be detected in each of the first image and the second image detected in the third step;

a fifth step of acquiring, as first corresponding points and second corresponding points, points on the first image and the second image corresponding to each of the plurality of model feature points of the model pattern transformed in the fourth step;

a sixth step of selecting, as a corresponding point set, a first corresponding point and a second corresponding point obtained on the basis of an identical one of the plurality of model feature points from among the first corresponding points and the second corresponding points obtained for the respective first image and second image of the object to be detected of the plurality of images; and a seventh step of calculating the three-dimensional position of each of the feature points of the object to be detected on the basis of the corresponding point set selected in the sixth step.

9. The image processing apparatus according to claim 1, wherein the first image of the plurality of images of the object to be detected is captured by the at least one camera at a first position, and the second image of the plurality of images of the object to be detected is captured by the at least one camera at a second position different from the first position.

10. The image processing method according to claim 8, wherein in the first step of acquiring the plurality of images, the first image of the plurality of images of the object to be detected is captured by the at least one camera at a first position, and the second image of the plurality of images of the object to be detected is captured by the at least one camera at a second position different from the first position.

* * * * *